United States Patent [19]

Rabinovich

[11] Patent Number: 6,144,008
[45] Date of Patent: *Nov. 7, 2000

[54] RAPID MANUFACTURING SYSTEM FOR METAL, METAL MATRIX COMPOSITE MATERIALS AND CERAMICS

[76] Inventor: Joshua E. Rabinovich, 15 Voss Ter., Newton, Mass. 02159

[*] Notice: This patent issued on a continued prosecution application filed under 37 CFR 1.53(d), and is subject to the twenty year patent term provisions of 35 U.S.C. 154(a)(2).

[21] Appl. No.: 08/755,214

[22] Filed: Nov. 22, 1996

[51] Int. Cl.[7] .......................... B23K 26/00; B21F 45/00; B29C 41/02; B29C 71/04

[52] U.S. Cl. ................................. 219/121.64; 219/76.14; 156/180; 156/272.8

[58] Field of Search ............................... 219/76.1, 76.12, 219/76.14, 121.64, 121.66, 121.85; 427/596, 597, 555, 556; 148/525; 364/468.25, 468.26, 474.08; 156/272.8, 180, 166, 296

[56] References Cited

U.S. PATENT DOCUMENTS

| | | |
|---|---|---|
| 1,533,300 | 4/1925 | Baker . |
| 3,156,968 | 11/1964 | White, Jr. . |
| 3,558,846 | 1/1971 | Ujiie . |
| 3,737,616 | 6/1973 | Ujiie . |
| 3,821,840 | 7/1974 | Kershaw . |
| 3,952,180 | 4/1976 | Gnanamuthu . |
| 3,974,016 | 8/1976 | Bondybey et al. ................... 156/272.8 |
| 4,323,756 | 4/1982 | Brown et al. . |
| 4,577,330 | 3/1986 | Hull . |
| 4,743,733 | 5/1988 | Mehta et al. . |
| 4,803,334 | 2/1989 | Burke et al. . |
| 4,826,736 | 5/1989 | Nakamura et al. .................. 148/525 X |
| 4,841,617 | 6/1989 | Schmidt et al. . |
| 4,857,693 | 8/1989 | Rump . |
| 4,863,538 | 9/1989 | Deckard . |
| 4,931,125 | 6/1990 | Volkmann et al. . |
| 4,947,463 | 8/1990 | Matsuda et al. . |
| 5,038,014 | 8/1991 | Pratt et al. . |
| 5,121,329 | 6/1992 | Crump . |
| 5,127,364 | 7/1992 | Savkar et al. ........................ 427/597 X |
| 5,134,569 | 7/1992 | Masters . |
| 5,147,587 | 9/1992 | Marcus et al. . |
| 5,208,431 | 5/1993 | Uchiyama et al. . |
| 5,233,150 | 8/1993 | Schneebeli et al. . |
| 5,266,139 | 11/1993 | Yokota et al. . |
| 5,303,141 | 4/1994 | Batchelder et al. . |
| 5,578,227 | 11/1996 | Rabinovich . |
| 5,738,817 | 4/1998 | Danforth et al. .............. 364/468.26 X |

FOREIGN PATENT DOCUMENTS

| | | |
|---|---|---|
| 688500 | 1/1964 | Canada . |
| 0529816 | 3/1993 | European Pat. Off. .............. 219/76.1 |
| 2583333 | 12/1986 | France . |
| 3905684 | 8/1990 | Germany . |
| 63-33187 | 2/1988 | Japan ................................ 219/121.64 |
| 299286 | 4/1990 | Japan . |
| 04288974 | 10/1992 | Japan . |
| WO8806564 | 9/1988 | WIPO . |

OTHER PUBLICATIONS

George Schaffer, "Laser Solves Spotwelding Problems", American Machinist (Apr. 1, 1975) as republished in the Source Book on Electron Beam and Laser Welding, pp. 337–340 (Mar. 1983).

*Primary Examiner*—Samuel M. Heinrich
*Attorney, Agent, or Firm*—James Creighton Wray; Meera P. Narasimhan

[57] ABSTRACT

A product building system uses a stage movable in X-Y-Z directions for holding and moving a product. A fixed laser is focused on a spot on the products. Strips of materials are fed tangent to a forming direction from two sources on a rotating platform. The laser continuously or periodically welds and fuses a strip on the product. Relative motion bends the strip to the desired product shape. The laser cuts a strip and welds a new strip to form alternating layers. Side by side strips are butt-welded. Cores are formed differently from outer surfaces, using the continuous feeding, welding, fusing, bending, welding and fusing process. A mill on the rotating platform brings a mill end tool into contact with the layers to smooth lateral and upper surfaces.

16 Claims, 2 Drawing Sheets

M—METAL
G—GRAPHITE

RAPID MANUFACTURING SYSTEM FOR METAL, METAL MATRIX COMPOSITE MATERIALS AND CERAMICS

BACKGROUND OF THE INVENTION

The existing industrial era dominated by mass production is giving way to a new era or flexible manufacturing. Flexible manufacturing is a key manufacturing strategy for modern industries, in which complex shaped structural components are prevalent but quantity requirements are low, resulting in high unit costs and long lead times.

Rapid prototyping, or layered manufacturing is perhaps one of the most significant new technologies which enables the full realization of the power of modern Computer Aided Design (CAD) and Computer Aided Engineering (CAE) tools. CAD and CAE provide the concurrent design and analysis of a component in order to obtain the optimal structural layout and details about its material composition.

The materialization of such optimal designs requires unconventional manufacturing processes, such as layered manufacturing. This integrated product and manufacturing process development is especially critical in the modern industries such as aircraft, airspace, automotive and medical implants and prosthetics, to name a few.

The demand for an affordable, high strength, lightweight complex components, capable of operating at elevated temperatures and in adverse environments, requires continuous efforts in advanced structural designs, new materials and manufacturing processes.

To meet these requirements, materials such as Titanium and continuous fiber Titanium Matrix Composites, which have stable high specific strength properties at elevated temperatures, must be implemented, and the fabrication technology to incorporate these materials into lightweight structural concepts must be developed.

The stumbling block toward the wide use of these materials has been the very high cost of the existing manufacturing methods used for the production of components from such materials. For example, titanium is difficult to machine and requires fabrication processes such as the Superplastic Forming and Codiffusion Bonding (SPF/DB) of titanium sandwich structuring. These fabrication processes require high tooling costs and long lead time.

Even more complex and expensive multi-step methods are used for the production of MMC components, such as foil/fiber layering with High Isostatic Pressure (HIP) consolidation. Very high capital and running costs are typical for these manufacturing processes.

Rapid Prototyping or Free Form Fabrication is present one of the fastest developing manufacturing technologies in the world.

Free Form Fabrication through layered material deposition has proved to be an attractive method for 3D object generation. The layered part buildup offers the possibility of expanding the implementation of advanced designs with respect to part complexity, multi-layer multi-material structures, and the optimal material distribution within the desired part.

Although significant improvements in application of high temperature structural materials have been achieved with such processes as SLS, Thermal Spray Shape Deposition and 3D welding, a number of inherent processing limitations prevents them from producing parts with structural integrity and accuracy readily obtainable by conventional manufacturing methods.

One of the main shortcomings of Thermal Spray Shape Deposition and 3D welding methods is the requirement for the liquefaction of the feedstock material prior to its spay or cladding deposition, which results in high energy deposition, large residual stresses, poor mechanical properties, layer debonding, and part distortions. In the case of metal powder sintering, the main shortcomings are the limited choice of specially prepared multiphase metal powder materials with limited physical and mechanical characteristics. The fabricated parts have low density and require a time consuming and expensive postprocessing. The part accuracy is unpredictable due to significant shrinkage after postprocessing.

In the Sheet Lamination Process as applied to metal layers deposition, the process is limited to layers joining by bonding or soldering. Attempts to use welding as a layer joining method proved to be difficult.

None of those processes lends itself to the production of continuous fiber MMC materials.

Extensive research efforts for the development of Rapid Prototyping technologies capable of producing metal and composite materials are being conducted within academic institutions and industry throughout the world. The USA leads the research community in this field, but in the last several years the research conducted in Europe has intensified, particularly in the area of rapid prototyping in metals. Several rapid prototyping processes, such as Thermal Spray Shape Deposition, 3D welding, Sheet Lamination Process and especially SLS, have progressed in the application of metal materials.

Originally, the process of Selective laser Sintering (SLS) was developed by the University of Texas at Austin. DTM Corporation has developed this process into a multi-step called RapidTool process that is capable of producing metal parts. It is a time consuming process for molding making using plastic coated iron based metal powder. Current research is being conducted on two-phase metal powder material such as Bronze-Ni.

SLS's main shortcomings are the limited choice of specially prepared multiphase metal powder materials with limited physical and mechanical characteristics. The fabricated parts have porosity and require a time consuming and expensive postprocessing. Part accuracy is unpredictable due to significant shrinkage after postprocessing.

Other related work is Thermal Spray Shape Deposition, 3D Welding and Laser Cladding.

Carnage Mellon University uses an arc-spray system in which two melted wires are sprayed onto a substrate to generate a part layer.

The University of Nottingham in the U.K. uses a MIG welding torch which melts a 0.8 mm feed wire with a current of 100 A and deposits it in the shape of a bead of weld that is approximately 4.5 mm wide and 1.4 mm thick. Using this technology, these dimensions represent the resolution of the system.

IPT in Germany is working on a metal part generation process with laser cladding which involves directing a high power laser (700 W CO) onto the substrate, and simultaneously melting the powder or wire feedstock at the laser spot.

One of the main shortcomings of Thermal Spray Shape Deposition, 3D welding and Laser Cladding methods is the requirement for the liquefaction of the feedstock material prior to its spray or cladding deposition, which results in high heat buildup, large residual stresses, poor mechanical properties, layer debonding, and part distortions.

SLS as well as 3D Printing processes have the promise of mixing fiber reinforcing particulates into a powder mix (SLS) or into ceramic slurry (3D printing), thus enabling the production of MMC or CMC components.

None of those processes lends itself, though, to the production of continuous fiber reinforced MMC materials which dominate military applications because of their superior performance/cost characteristics.

SUMMARY OF THE INVENTION

The Solid Feedstock Free-Form Deposition (SFFD) System addresses those limitations by using a proprietary process developed for a free form deposition of a full density metal feedstock without its prior liquefaction. The result is significantly lower energy deposition for the fusion process, thus the reduction of internal stresses, and the improvement in the part accuracy. There is no requirement for a part postprocessing and the part accuracy is comparable with the accuracy achieved by such conventional manufacturing processes as milling and turning.

DETAILED DESCRIPTION OF THE DRAWINGS

Figure 1:
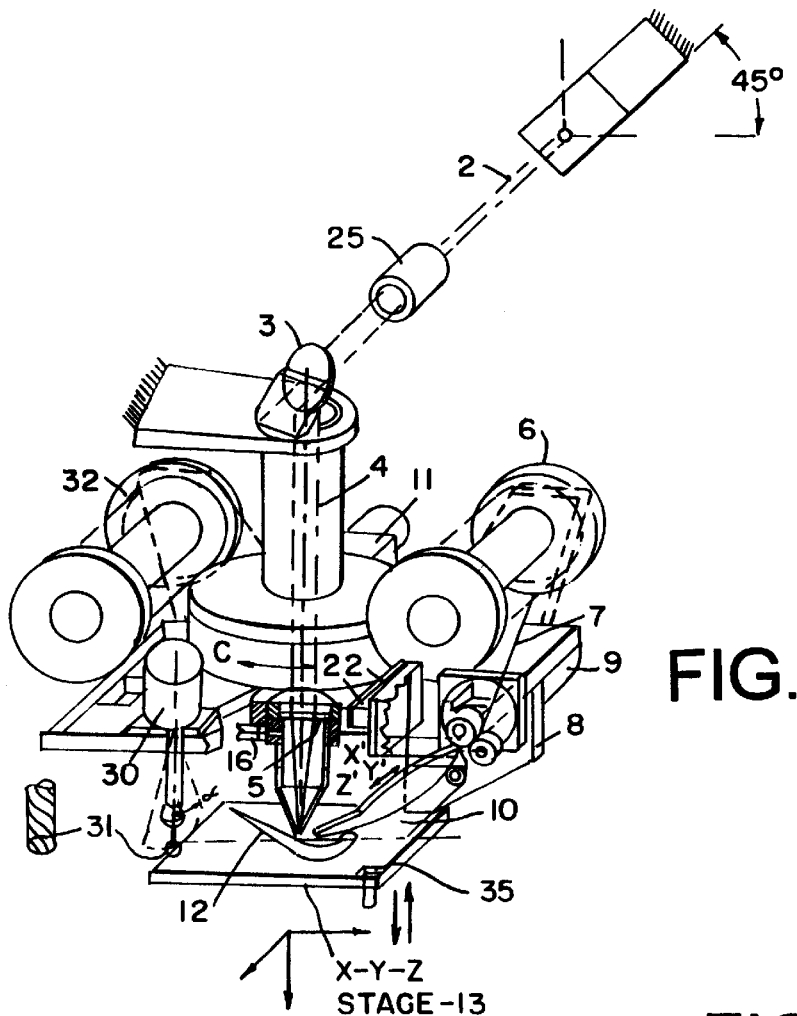
FIG. 1 shows a rapid manufacturing system of the present invention.
Figure 9:
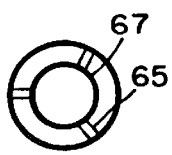

Referring to FIG. 1, a laser head 1 is supported on a frame for projecting a laser beam 2 through a beam expander 25 onto a phase shift mirror 3, which is also supported on a frame. The redirected beam 4 is directed through a rotary assembly and into a focusing lens 5, which focuses the beam energy on the product 12 as it is being formed on stage 10. The feedstock 7 is delivered from a reel 6 through feed rollers mounted on the end of feed motor 9. The reel and feed structures are mounted in a frame 8, which is mounted on a rotary stage 11. The rotary stage 11 is driven in a direction shown by the arrows C by a motor and reduction gear shown at rear of stage 11. A milling motor drives the mill 31, shown enlarged at the left, which is used to maintain the flatness of the top layer of the product 12. The mill motor and shaft assembly may be rotated through an angle a as shown to produce a chamfer on the edge of the feedstock. This provides a smooth transition between the shifted current layer and the previous layer, as shown in FIG. 9. The stage 10 is moved in X, Y and Z directions, as shown at 13. Feedstock preparation station 35 is maintained for preparation of the wire prior to deposition. Actuators keep station 35 in the focused plane of the laser. The mill 31 may be brought to the product. Preferably the table is moved in the X and Y direction to bring the product into contact with the mill. Additional or alternative feedstock material is held on a reel 32, which is similar to reel 6. A similar feedstock drive 9 may be mounted on a similar frame 8 beneath the reel 32. Moving stage 22 is used to relatively position the laser beam, focusing lens and gas nozzle assembly with respect to the feedstock delivery system. Inert gas such as nitrogen or argon is introduced through inlet 16.

In large constructions the product holding stage may remain stationary, and the laser beam and feedstock delivery system move in X, Y, Z directions while the feedstock delivery system rotates.

Figure 2:
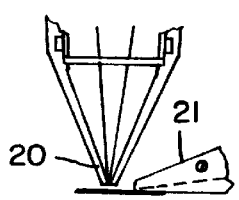
FIG. 2 is a detail of the nitrogen nozzle and feedstock delivery nozzle.

As shown in FIG. 2, the gas is delivered through a nozzle 20 which surrounds the beam to flood the welding area of the feedstock which is delivered from the feedstock delivery nozzle 21.

Figure 3:
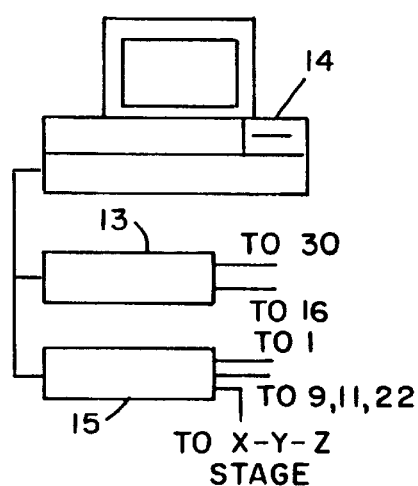
FIG. 3 is a schematic representation of a controller.

FIG. 3 shows a controller 14 with a multiple access controller with outputs to the laser head 1 and to the feedstock drive 9, the rotary stage drive 11 and the feed positioning actuators 22, as well as to the X, Y, Z stage 13, as shown in FIG. 1. The controller 14 shown in FIG. 3 also has a multifunctional card 13, which supplies outputs to the mill 30 and to the inner gas control input 16.

Depending on the aspect ratio of a feedstock profile, the new process permits building overhang structures up to about 15 degrees of the horizontal without any support structures. For example, with a feedstock size of 0.010" thick and 0.040" wide an overhang wall can be built about 18° to the horizontal without support structures.

The SFFD process lends itself to the production of continuous filament fiber-reinforced metal matrix composite (MMC) materials by alternating various materials within the part's cross-section.

Figure 4:
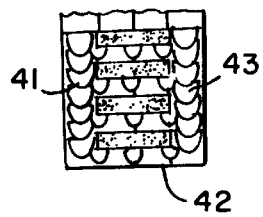
FIG. 4 is a cross-sectional detail of an alternate layer buildup of a continuous filament fiber reinforced metal matrix composite.

The example in FIG. 4 shows how the process can be utilized for fabrication of MMC components using a metal flat wire feedstock having 0.020" width and 0.010" thickness, and a pre-impregnated carbon fiber tape having 0.040" width and about 0.010" thickness. The component has a shell, with the wall of the shell being about 0.085" thick . The wall is constructed so that the outer surfaces (strands 41 and 43) are built out of metal and the internal wall structure is a combination of a continuous carbon fiber tape 42 layered between the metal strips.

Figure 5:
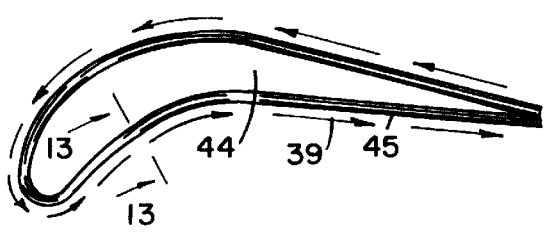
FIG. 5 shows the construction of a compressor blade.

The operation of the SFFD System is explained based on the example of the fabrication of a complex cross-section profile, such as the aircraft compressor blade airfoil depicted in FIGS. 4 and 5. On the basis of the blade cross-sections represented in CAD software, a feedstock path 39 is generated by following the boundaries and the pattern defining the part's layers. The interior 44 of the blade is hollow. The wall 45 is built as shown in FIG. 4.

Prior to fusion of feedstock strand onto a substrate, the end shape of the feedstock is precut if necessary.

FIG. 4 shows a cross-section of the wall of the part's shell built on the SFFD System. The arrows on FIG. 5 show the feedstock nozzle orientation and the feedstock delivery direction 39 during the layer buildup. The system's rotational range is +/−360° or multiples thereof. Parts may be built spirally.

Figures 6, 7:
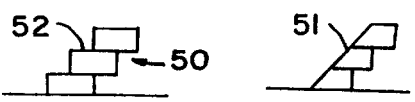
FIGS. 6 and 7 are details of a buildup of components of FIG. 8 without and with milling.
Figure 8:
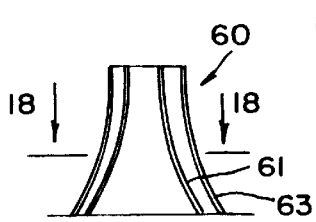
FIGS. 8 and 9 are respectively a vertical cross-section and a horizontal cross-section taken along line C—C of FIG. 8 showing a built up parabolic nozzle having separated walls and joining sections.

Stairsteps is one of the accuracy problems common to a layered or laminated part buildup. The operation of an end mill (31, FIG. 1) device removes 51 stairsteps 52 from overhang structures such as shown in FIGS. 6 and 7. The milling feature may be used for the removal of the "stairstepping effect" existing in any layered manufacturing. FIG. 8 shows a part which would have "stairstepping effect" shown in FIG. 6. The stairstepping is removed as shown in FIG. 7 with a milling tool 31 shown in FIG. 1. The milling tool has an angular adjustment for changing the chamfer angle to accommodate for various degrees of "stairstepping". The same tool, for example an end mill, can be used for cleaning the top surface of the newly deposited layer in order to maintain the latest layer flatness and tolerance in the Z direction. The latter function of that end mill tool can be performed by a separate grinding wheel tool, which is a faster way to clean the top surface of the layer. That feature may be used during the production of a complex 3-D part—a coaxial parabolic nozzle, out of titanium, shown in FIGS. 8 and 9. The part h as base outside and inside diameters of 1.25" and 1" and is 1" high.

FIGS. 8 and 9 show a nozzle having inner and outer layers 61 and 63 separated by bridging 65, which is butt welded 67 to the inner and outer layers as the layers and bridging are formed.

Figure 10:
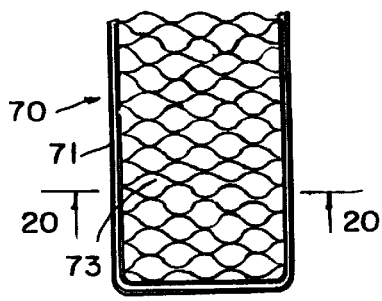
FIG. 10 is a cross-sectional plan view of a three-dimensional article made with a honeycomb interior taken along line B—B of FIG. 11, all formed by the present invention.
Figure 12A:
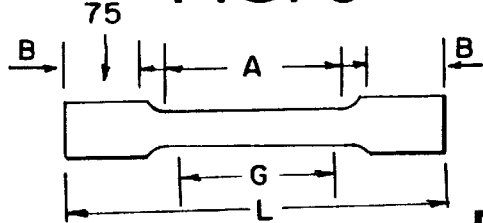
FIGS. 12A and 12B are elevational and end views of a structure made according to the present invention.
Figures 11, 12B:
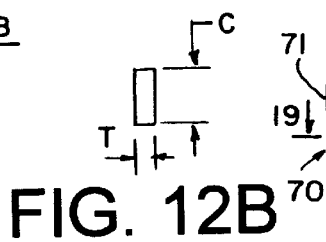
FIG. 11 is a cross-sectional elevation taken along line E—E of the structure shown in FIG. 10.

FIGS. 10 and 11 show structures formed of multi-strand exterior walls 71 and butt welded honeycomb interiors 73.

FIGS. 12A and 12B are elevational and end views of a beam structure 75 made according to the present invention. The beam may have a composite structure such as, for example, shown in FIGS. 4, 13 and 14, or may have a honeycomb interior such as shown in FIGS. 10 and 11. The beam may be made of layers of laser-fused and hardened ceramic materials. Because of immediate rigidification, all material reformation is compensated as the strands are guided on the product.

The invention is directed to fusing or sintering feedstock materials in any combination. separate metal or nonmetal feedstock materials are used for fabricating strictly metal or strictly nonmetal parts. Simultaneous use of metal and nonmetal may be used in multiple feedstocks. By alternating the materials within a cross-section, composite material parts are fabricated. Composite material parts can also be fabricated by using a single feedstock material which comprises the combination of metal and nonmetal.

The invention produces solid models out of a wide range of metal, nonmetal and composite materials. Materials such as Titanium, Ni—Cr stainless steel alloys, glass, polypropylene and polyethylene are readily available in the form of wire, fibers or strips, and have been laser welded and cut with excellent results. When the continuity of the feedstock must be interrupted, the deposited laser energy is increased to the level sufficient for the feedstock cut.

Although there is a wide range of metal and non-metal materials of potential interest that can be used in the SFFD process, a limited number of materials and their combinations is described. Materials such as Titanium, 304 SST and Graphite Fiber Epoxy Prepreg Tape are the materials that are described herein.

In addition, cermets and ceramic materials may be used.

Metal and nonmetal materials, as well as a new class of materials such as cermet materials, may be used.

The competing rapid manufacturing technologies produce layered ceramic parts by first extruding "green" ceramic slurry (ceramic particles plus liquid binder) to generate the desired part, then the "green part" is sintered by placing the part into high temperature and high pressure environment. After that furnace treatment to bake out the binder material and to densify the part. Warpage and distortion due to material shrinkage limit the attainable accuracy of the final parts. There are commercially available "green" ceramic fibers generally available in a round cross-section shape and which are sufficiently ductile to extrude them within the feed mechanism into a shape with two opposite flat sides.

The present process allows deposition of the "green" flat fibers similar to the deposition of the metal flat wire.

A significant advantage of the present process of the deposition of a "green" ceramic material and the part building is in the simultaneous deposition, evaporation of the binder material and sintering. The material's sintering and densification occur during the feedstock fusion process. The simultaneous feedstock fusion, sintering and densification are occurring while the geometry of the part is being constructed.

Because the mass of the material being sintered is confined to a small section of a thin fiber affected by the energy source beam spot, the cooling of this small region of the fiber is fast. The effect of material shrinkage resulting from the sintering is incorporated into the process of the part construction, with a minimal effect on the accuracy of the final part. The final part accuracy will not be effected by post construction heat treatment, as is the case with the competing technologies.

Titanium is an attractive metal for aircraft structural components for several reasons: high temperature capability (1000° F.), low density, high strength and stiffness, high damage tolerance, and corrosion resistance. Titanium has excellent laser weldability, and therefore it has good potential for the application of the SFFD processes.

MMC materials offer a number of advantages over conventional metals. Their superior lightness, strength and stiffness aid in improving aircraft payload-range capability, and can provide the opportunity to downsize subsystems. Unidirectional graphite fiber epoxy prepreg tape with cross-section of 0.010"×0.040" may be used.

Figure 13:
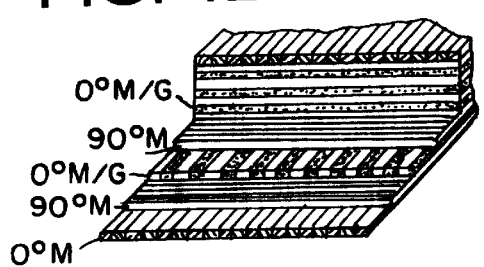
FIGS. 13 and 14 are cross-sectional details of multiple and alternating layer products of the present invention.
Figure 14:
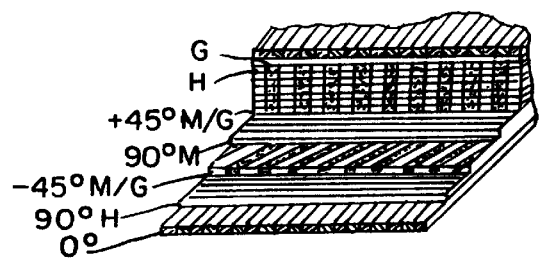

The MMC products may be fabricated following the layers lay up configuration shown in FIGS. 13 and 14. For example, 0° metal, 90° metal, 0° metal and graphite, 0° metal, 90° metal and graphite, several repeats of the last two alternatives, and finally 0° metal, as shown in FIG. 13. Special attention during this process insures a proper inert environment in the vicinity of graphite fiber during fusion in order to prevent its oxidation and damage.

As applied to the performance of the new SFFD System, and considering a feedstock thickness of 0.010" to 0.020" thick and 0.020" to 0.040" wide, welding speeds of 100 to 300 in./min. can be achieved. That may be realized in a rate of metal deposition between 1.6 lb/hr. to 2.3 lb/hr. Clearly, the rate of deposition also depends on the part geometry and can be improved by proper selection of the feedstock thickness and width as applied to a particular component.

The high rate of metal deposition in the new SFFD process is combined with the laser's ability to perform low-heat-input welding operations. The key to understanding this laser capability is in considering the laser's operating pulse width. For example, consider a laser operating at the parameters of 10 Joules, 4 ms pulse and 10 Hz, the average power is 100 W (10 J×10 Hz) and the pulse peak power is 2.5 kW (10 J/4 ms). Thus, a very small amount of energy is enough to perform the weld process.

The new SFFD process fully utilizes this basic advantage of low-heat-input laser welding with the resulting low heat buildup and low distortions, and combines it with the proprietary precision controlled feedstock shape contouring capabilities. That results in a superior method of affordable manufacturing of complex structural titanium and MMC components with high production rates, and a truly rapid manufacturing process.

A fully automated Rapid Manufacturing - Free Form Fabrication System capable of producing affordable, complex 3-D structural components from metals and continuous filament metal-matrix composite (MMC) materials is based on a full density metal deposition process and system to produce continuous filament metal-matrix composite materials. Evaluation of sample 3-D parts produced on the system directly out of nickel alloy indicates the process capabilities and its application in rapid and affordable manufacturing of complex metal and MMC components.

One element of the new system is the Solid Feedstock Freeform Deposition (SFFD) process in which a solid flat feedstock of metal or nonmetal material is laser fused onto a substrate, while simultaneously being formed into a desired geometrical shape.

Because the feedstock is a full density material and its fusion to a substrate is performed in conventional modes of laser welding, no liquefaction is required prior to the material deposition. That results in a significant reduction in energy deposited during the fusion process, which means reduced internal residual stresses in the part, less deformation, and better accuracy of the part.

The present invention provides the capability of fusion of the feedstock side to the side of the adjacent feedstock in the same layer. The scanning of the energy beam transverse to the feedstock long axis allows the butt welding of the adjacent sides. That provides for multiple passages of the feedstock in the same layer.

The beam scanning occurs not only across the feedstock, but also along the feedstock's long axis. The additional movement allows butt welding of the feedstock end to the previously laid feedstock pass in the same layer, as shown in FIGS. 9 and 10.

The following capabilities of the new process show its affordability, high production rate, and set it apart from the existing Rapid Manufacturing processes:

a. No postprocessing is required. The proper choice of laser welding parameters assures high quality, low Heat Affected Zone welding having the mechanical characteristics equal to the base material. The result if less residual stress and higher accuracy parts, savings on expensive postprocessing tooling, and in production cycle time.

b. The use of a flat solid feedstock allows the production of parts with large "overhang" structures without the need for time consuming "sacrificial material layers" or support structures used in other Rapid Manufacturing methods.

c. The materials of construction are of full density as opposed to powder sintered materials where porosity is always present.

d. There is the capability of producing continuous fiber MMC materials at room temperature and pressure and with precision control of spacing of fibers.

FIG. 1 depicts the new SFFD System. FIGS. 4–14 show examples of complex 3-Dimensional 304 SST parts that can be produced on the system. A fully functional SFFD System incorporates the above-mentioned features and capabilities. The new Multiple Feedstock Module (MFM) affects the system's resolution and overall accuracy of fabrication, the higher power laser and its effect on the quality and speed of fusion.

Multiple-Material deposition techniques as well as Graphite Fiber Tape deposition and encapsulation techniques are used. Graphite tape/metal cavity placement provides the possibility of a reliable placement of the graphite tape into the metal cavity and its subsequent fusion bonding onto the substrate.

The system is used to manufacture metal and MMC complex shapes such as honeycomb structures and other features found in complex structural components.

While the invention has been described with reference to specific embodiments, modifications and variations of the invention may be constructed without departing from the scope of the invention, which is defined in the following claims.

I claim:

1. A product building method comprising storing on plural storers plural thin feedstocks which have preselected profiles, feeding a solid feedstock from one of the storers and joining the fed feedstock to a substrate or to a previous layer by means of adhesion or welding with a laser energy source, while keeping the feedstock cross-section in substantially original shape.

2. The method of claim 1, further comprising relatively moving the feedstock storers and a substrate in an X-Y plane and tracing a boundary and an interior of each cross-sectional region of a desired product.

3. The method of claim 2, wherein the energy source is a laser beam further comprising rotating a feedstock dispensing nozzle around an axis coincident with the laser beam.

4. The method of claim 3, further comprising continuously positioning a feedstock delivery axis in a direction tangential to a boundary curvature of the product.

5. The method of claim 1, further comprising concurrently feeding the feedstock while fusing the feedstock.

6. A 3-D product building method comprising storing plural thin feedstocks of metal and of nonmetal materials which have preselected profiles, feeding one of the feedstocks through a feedstock dispensing nozzle to a desired location, fusing the feedstock with a laser beam of a size and power density for producing a limited local heat input sufficient for a spot or continuous welding of the feedstock to a previous fused layer, while keeping the feedstock cross section in substantially original shape, and producing accuracy and dimensional stability, and a surface quality of the 3D model results.

7. The method of claim 6, further comprising relatively moving in X-Y directions a substrate on which the layer is produced on a plane transverse to the laser beam and tracing a the boundary and interior of each cross-sectional region of a desired part beneath the feeding of the feedstock, rotating the feedstock dispensing nozzle around an axis of the laser beam, and continuously positioning a delivery axis of the feedstock in a direction tangential to the boundary at a point where the feedstock is being fused to a previous layer.

8. The method of claim 7, further comprising forming the laser beam by directing a linearly polarized beam from a laser source to a phase shifting mirror, converting the linearly polarized beam to a circularly polarized laser beam at the mirror, and directing the circularly polarized beam to a lens and focusing the beam with the lens to a spot on the feedstock.

9. The method of claim 8, further comprising storing the plural feedstocks on plural spools, drawing one of the feedstocks from one of the spools and forcing the feedstock into the dispensing nozzle with a feedstock drive, curving the feedstock in the dispensing nozzle before releasing the feedstock from the nozzle, introducing gas along the beam and releasing gas near the focused beam.

10. The method of claim 9, further comprising rotating the spools, the feedstock drive, the nozzle and the lens as an assembly around an axis of the laser beam, relatively moving the axis of the laser beam and the assembly along a line on which the feedstock is to be fused, turning the assembly about the axis as the line curves, and moving the lens and traversing a beam spot across the feedstock for welding and cutting the feedstock.

11. A method for generating shaped products, comprising feeding a first strip of first material toward a desired position on the product and laying the first material on the product while simultaneously energizing and fixing the material in place with laser, bending the strip of material by moving the strip of material repeatedly or continuously while feeding the material and energizing and fixing the strip of material to new locations on the product, cutting the first strip of material, feeding a second strip of a second material to the product, energizing and fixing the second strip of material on the product, bending the second strip by moving the second strip of material and further bending, energizing and fixing the second strip of material in further locations on the product.

12. The method of claim 11, further comprising alternating distinct layers of materials on the product.

13. The method of claim 11, further comprising advancing an end milling tool into contact with the product and milling a lateral surface of the product.

14. The method of claim 13, further comprising supporting a laser system and a platform in fixed position spaced from the product, supporting a rotating platform on the fixed platform, supporting material supplies of the multiple material strips on the rotating platform, and supporting a milling machine having an end mill tool on the rotating platform.

15. The method of claim 14, further comprising controlling the milling and feeding differentiated material strips to the product, controlling movement of strip feeders and controlling movement of the product by a multi-functional and multi-axis controllers in a computer.

16. The method of claim 11, wherein the feeding and fusing comprises feeding and fusing alternating strips to the product laterally adjacent in one layer and simultaneously fusing the adjacent strips.

* * * * *